(12) United States Patent
Hansen

(10) Patent No.: US 9,139,124 B2
(45) Date of Patent: Sep. 22, 2015

(54) LOAD-STRAPPING DEVICE

(75) Inventor: Lars V Hansen, Ringe (DK)

(73) Assignee: Qulatec ApS, Odense (DK)

( * ) Notice: Subject to any disclaimer, the term of this patent is extended or adjusted under 35 U.S.C. 154(b) by 91 days.

(21) Appl. No.: 14/006,666

(22) PCT Filed: Mar. 20, 2012

(86) PCT No.: PCT/DK2012/050083
§ 371 (c)(1),
(2), (4) Date: Nov. 25, 2013

(87) PCT Pub. No.: WO2012/126476
PCT Pub. Date: Sep. 27, 2012

(65) Prior Publication Data
US 2014/0298629 A1  Oct. 9, 2014

(30) Foreign Application Priority Data
Mar. 21, 2011 (DK) .............................. 2011 00056 U

(51) Int. Cl.
*B60P 7/06* (2006.01)
*B60P 7/08* (2006.01)

(52) U.S. Cl.
CPC . *B60P 7/06* (2013.01); *B60P 7/083* (2013.01); *Y10T 24/2175* (2015.01)

(58) Field of Classification Search
CPC .. B66D 1/34; B66D 2700/0183; B60P 7/083; Y10T 24/175
USPC .......................... 254/214–216, 218, 221, 251
See application file for complete search history.

(56) References Cited

U.S. PATENT DOCUMENTS

| 2,053,976 | A  | * | 9/1936 | Stahl | 254/375 |
|---|---|---|---|---|---|
| 5,904,341 | A  | * | 5/1999 | Norrby | 254/243 |
| 7,464,915 | B2 | * | 12/2008 | Liu et al. | 254/217 |
| 7,950,629 | B2 | * | 5/2011 | Mamie | 254/225 |
| 8,702,065 | B2 | * | 4/2014 | Xiao | 254/217 |
| 2003/0146424 | A1 | * | 8/2003 | Lee | 254/237 |
| 2004/0075007 | A1 | * | 4/2004 | Goldstein | 242/370 |
| 2006/0197072 | A1 | * | 9/2006 | Huang | 254/217 |
| 2009/0013511 | A1 |   | 1/2009 | Chang |  |
| 2010/0205790 | A1 |   | 8/2010 | Chen |  |

FOREIGN PATENT DOCUMENTS

| FR | 2915856 | 11/2008 |
|---|---|---|
| WO | 2007113373 | 10/2007 |
| WO | 2009039372 | 3/2009 |

* cited by examiner

*Primary Examiner* — Emmanuel M Marcelo
(74) *Attorney, Agent, or Firm* — Ice Miller LLP

(57) ABSTRACT

A load-strapping device for straps used for securing a load on a vehicle comprises mutually pivotable frame parts (1, 2) which by their movement can rotate a two part spindle (3) in one direction (19) provided by pawls (10, 11) and a ratchet wheel (9). The spindle (3) is composed by a base part (12) and a pivotable part (13) that may pivot between a closed position while abutting on a stop (18) and an open position where the pivotable part (13) extends at an angle relative to the closed position.

9 Claims, 6 Drawing Sheets

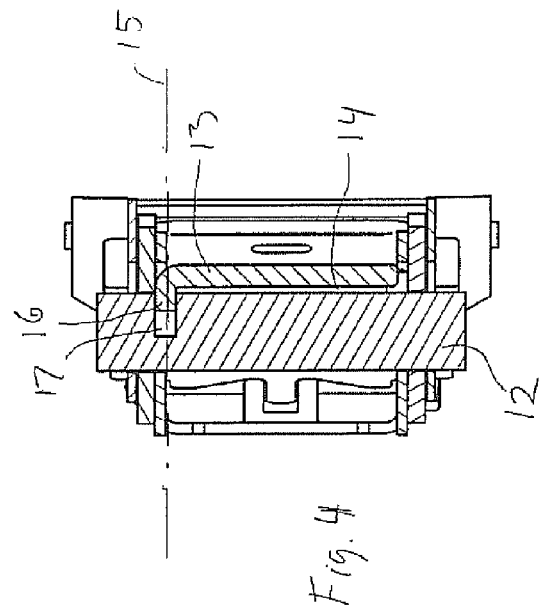
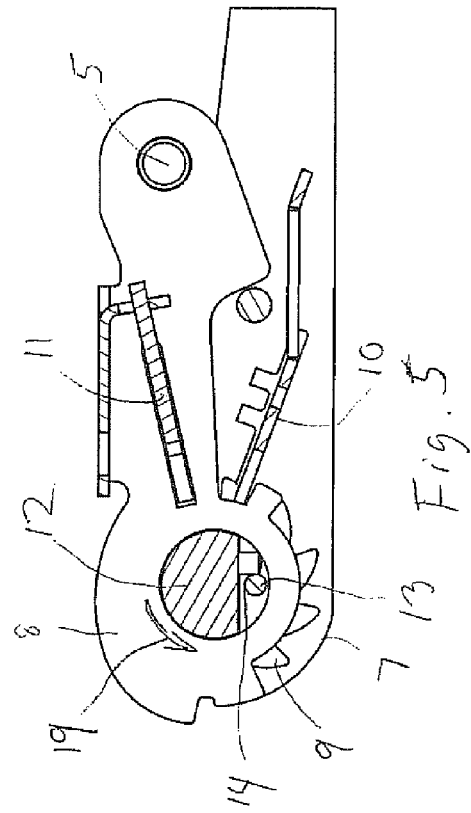
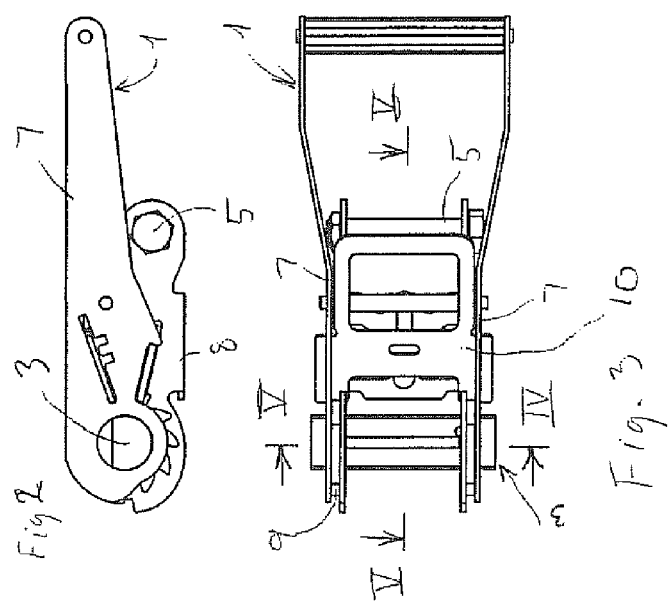

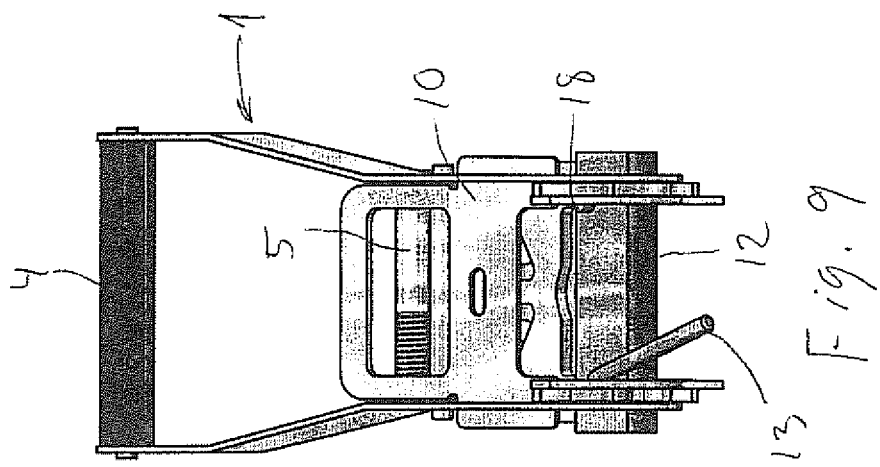
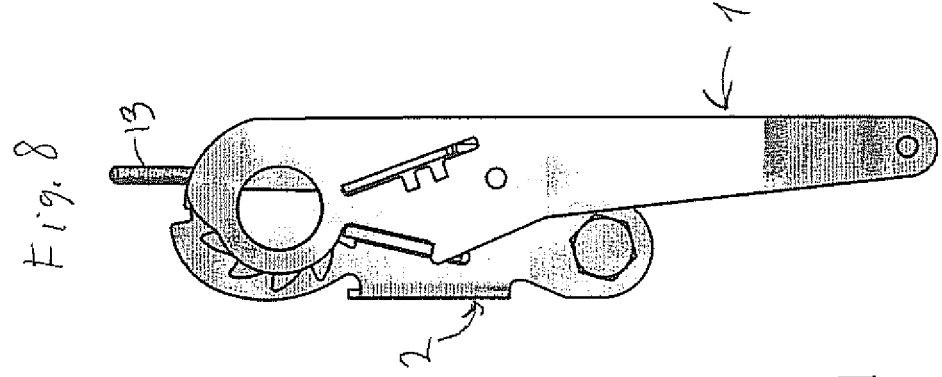
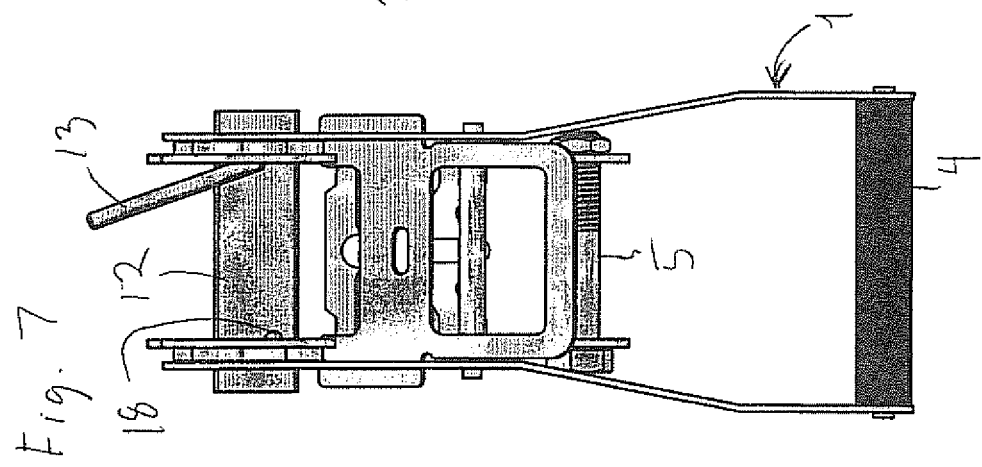

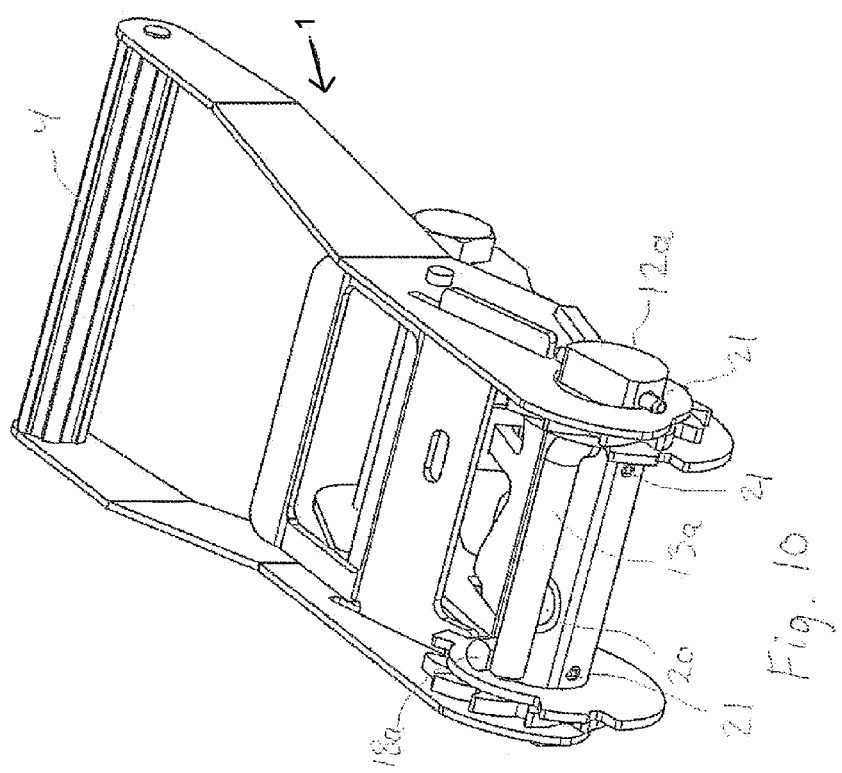

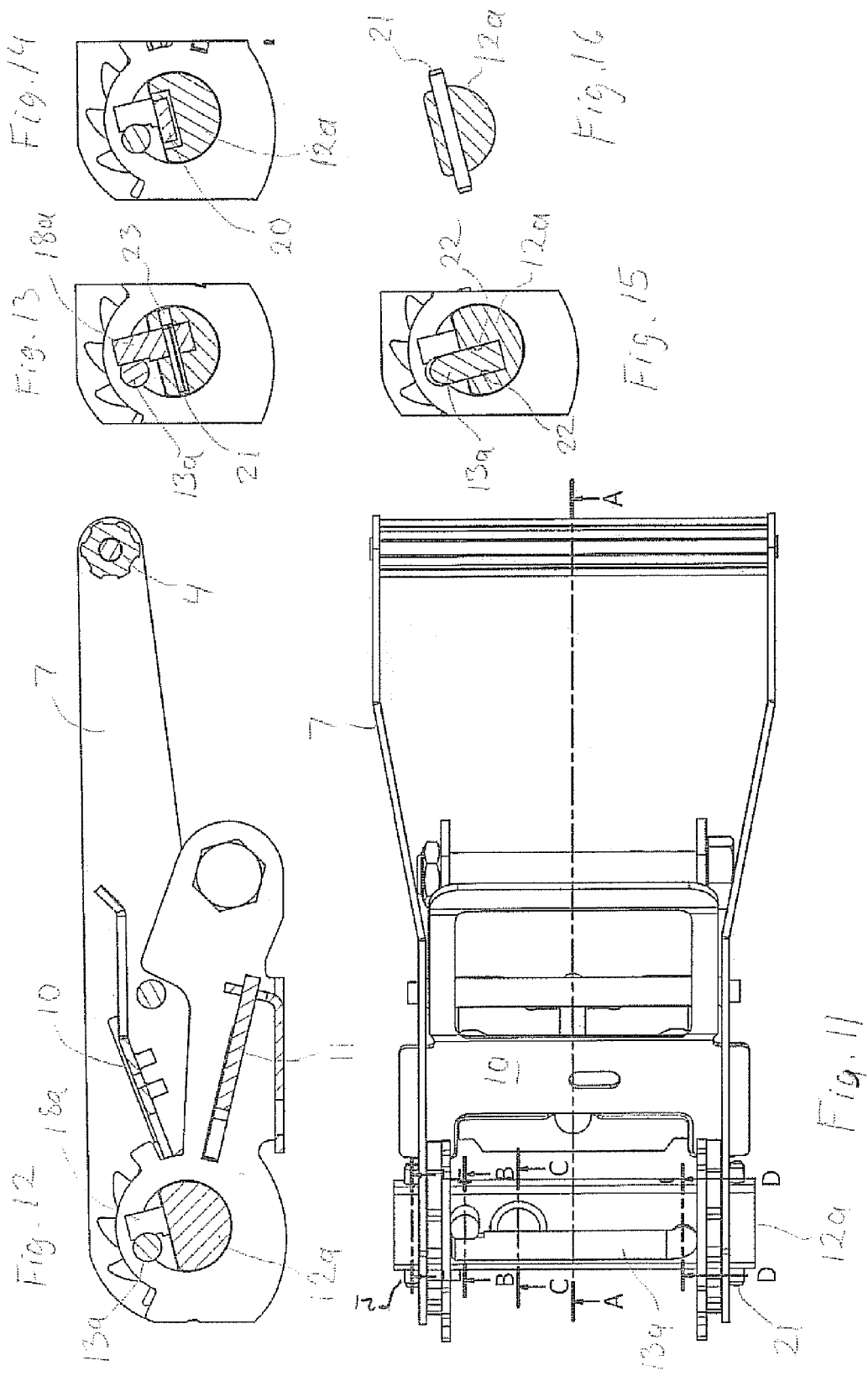

LOAD-STRAPPING DEVICE

FIELD OF INVENTION

The invention concerns a load-strapping device of the kind used for securing load to a vehicle, particularly trailers and lorries. The device is provided for joining and tensioning straps holding the load onto a platform or other load-carrying base.

BACKGROUND OF THE INVENTION

Prior art load-strapping devices are provided with a spindle extending between flanges of mutually pivoting frame parts of the device. A free end of a strap is passed through a slot in the spindle, and by a pawl-and-ratchet mechanism provided at the joint, the spindle is rotated in one direction, thus winding the strap around itself when the frame parts are repeatedly pivoted in opposite directions. Releasing the strap occurs by releasing the ratchet wheel by pulling two arresting pawls, one in each frame parts, against spring bias, allowing the spindle to rotate backwards and unwind the strap. After that, the free end of the strap can be pulled out from the slot. This prior art entails some tedious work with handling the sometimes long, free end of the strap and pulling it through the slot before tightening, and the reverse action of unwinding the strap end and finally pulling it out again. For a large load needing a plurality of straps, these actions have to be repeated many times.

US 2008/0244883 A1 discloses a strapping device where the spindle itself is a two-part design. A first part of the spindle can be moved relatively to a second part of the spindle in order to engage and/or release a strap between the parts of the spindle. The movement between the spindle parts for engaging and releasing the strap is lateral such that one spindle part is slid in parallel with the other part of the spindle, thus exposing a space where the strap is to be located. Thereby it is possible to place the strap in the exposed space without having to use and pull the end of the strap through a slot in the spindle. The slot is established after positioning the strap by sliding the other part of the spindle back into operating or closed position. Releasing the strap after unwinding is provided by reversing the movement of the movable part of the spindle. A similar design is disclosed in WO 2007/113373.

WO 2006/001714 discloses a strapping device with a bifurcated spindle. In one embodiment, the spindle is provided with two parallel arms joined by a bend. In the mounted condition, the parallel arms form a slot in the spindle. The spindle can be inserted and pulled out laterally in the joint between the movable parts. In this way, the strap can be fitted and removed without taking the free end of the strap and pull it through the slot. Releasing can be done by drawing the spindle laterally, thus allowing the windings of the strap to slide off the spindle.

The prior art presented in the cited documents all entail manipulation of a part of the spindle for engaging and disengaging the strap. In outdoor conditions operation may be impeded when using gloves for protection, slippery surfaces due to rain or ice, and dirt on the strap, especially when disengaging and releasing the strap from the strapping device.

EXPLANATION OF THE INVENTION

The strapping device according to the invention is peculiar in that the first part of the spindle is suspended pivotably about a pivot axis extending through one end of the spindle and substantially at right angles to the spindle so that the first part can be pivoted between a closed position defined as substantially in parallel with the second part of the spindle and so that a plane containing the pivot axis extends longitudinally through the first and second parts of the spindle, and an open position defined as the first part being pivoted so as to form an angle with the plane.

When mounting the strap, the first part of the spindle is pivoted into the open position and the strap is laid upon the exposed side of the second part of the spindle. After that, the first part of the spindle is pivoted back into the closed position and the strap can be tightened in the usual manner. Releasing the strap occurs by pulling back the pawls like the prior art device and begin unwinding the strap. When the spindle unwinds the strap, the first part of the spindle will pivot into its open position, thus releasing the strap which then can be removed without having to pull the remaining length of the strap through a slot or to manually remove a part of the spindle as envisaged by the art described in the cited documents. No manipulation is needed, especially when releasing the strap, thus facilitating the use of the strapping device and saving time for the operator.

In order to retain the first pivotable part of the spindle during rotation thereof it has to be arrested so that the strap does not move the first part of the spindle. A simple way of providing such a unilateral arresting of the pivoting movement of the spindle in the closed position is by letting the first part of the spindle abut with its distal end on a stop provided in the device.

It is preferred that the distal end of the first part of the spindle is biased towards its closed position by magnetic means. The magnetic means for biasing the end of the spindle towards its closed position can be constituted by a permanent magnet embedded in the surface of the second part of the spindle.

It is preferred that the first part of the spindle is made of a round rod with an angular bend at one end which extends into and is seated in the second part of the spindle. This is will provide a simple and cheap device.

Furthermore, it is preferred that the first part of the spindle is secured by a spring-type coiled pin or cotter pin provided in a boring in the second part of the spindle and engaging a groove in the end of the first part of the spindle seated in the second part of the spindle.

The stop can be a cylindric pin seated in and extending above the surface the second part of the spindle, and the cylindric pin may be secured by a spring-type pin or cotter pin provided in a boring in the second part of the spindle.

THE DRAWING

Exemplary embodiments of the invention are now described with reference to the drawing, in which:

FIG. 2 shows the same as FIG. 1 in a side view;

FIG. 3 shows the same as FIG. 1 in a plan view from above;

FIG. 4 shows a section on the line IV-IV in FIG. 3;

FIG. 5 shows a section on the line V-V in FIG. 3;

FIG. 7 shows the same as FIG. 6 in a plan view from above;

FIG. 8 shows the same as FIG. 6 in a side view;

FIG. 9 shows the same as FIG. 6 in a view obliquely from above;

FIG. 10 shows a perspective view of a second and preferred embodiment of a strapping device according to the invention with the spindle in closed position;

FIG. 11 shows the same as FIG. 10 in a plan view from above;

FIG. 12 shows a section on the line A-A in FIG. 11; and

FIGS. 13-16 show details as sections B-B, C-C, D-D and E-E, respectively, of the embodiment in FIG. 11.

DESCRIPTION OF EXAMPLE EMBODIMENTS

Figure 1:
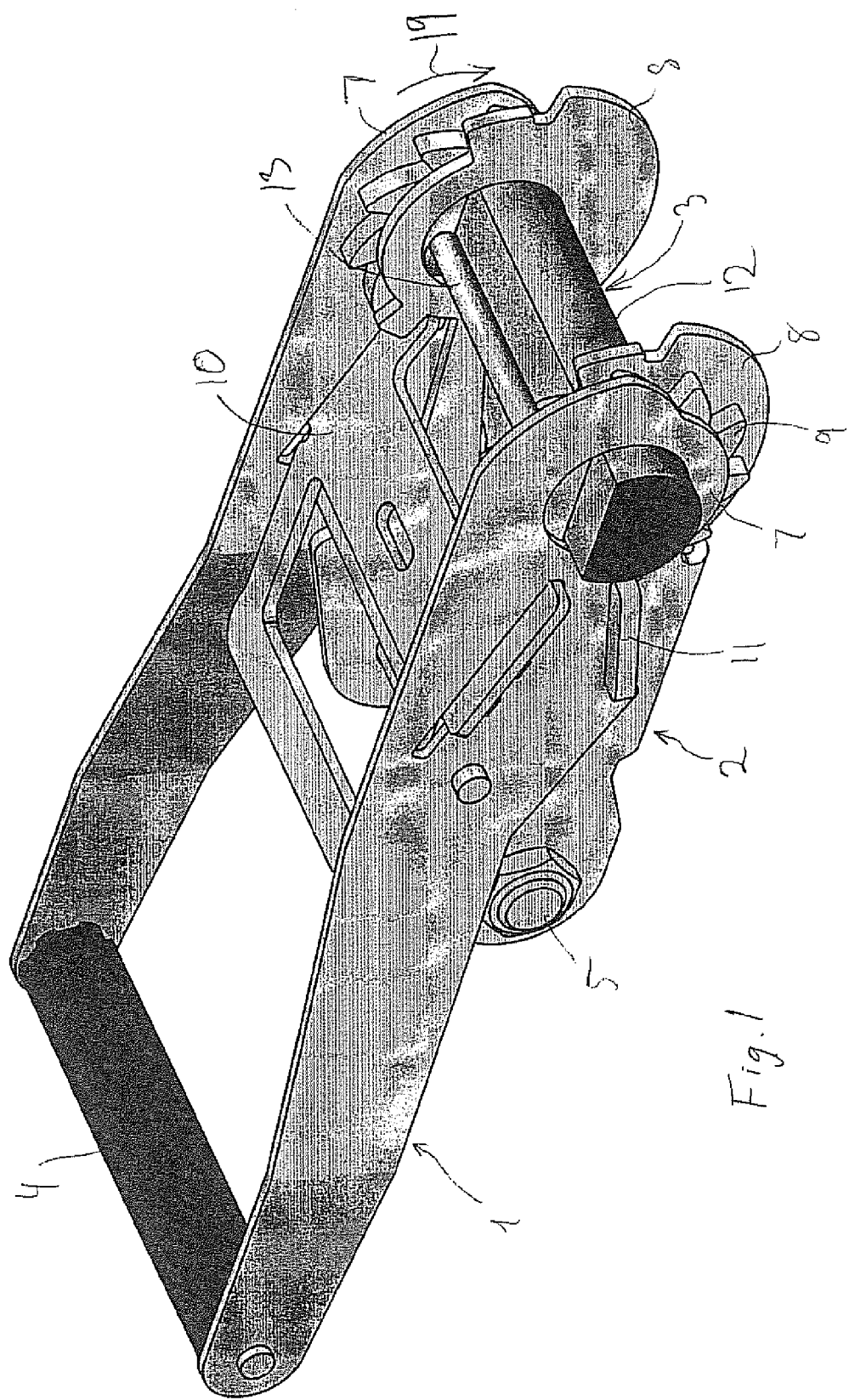
FIG. 1 shows a perspective view of a first embodiment of a strapping device according to the invention with the spindle in closed position.

The strapping device according to the invention comprises several parts in common with prior art devices for tightening and securing straps or belts on loads to be transported or be held firm together or to a base.

Both embodiments of the invention shown in the drawings include two mutually pivoting frame parts 1, 2 that are hingedly connected at a spindle generally designated by the number 3. One frame part 1 is provided with a handle 4 for use in the tightening operation, and the other frame part 2 is provided with a bolt 5 or rod member for securing the end of a not shown strap.

The spindle 3 extends between and through opposing and parallel flanges 7 and 8 of the frame parts 1 and 2, respectively. Similar to the prior art, the device according to the invention is provided with a pawl-and-ratchet mechanism for providing a one-way rotation of the spindle 3 when the parts 1 and 2 are pivoted in opposite directions. The main features of this mechanism is a pair of ratchet wheels 9 which are fixed to the spindle 3 between the flanges 7, 8, but rotatably seated in relation to the parts 1 and 2, and two spring-biased pawls 10, 11 provided in respective frame parts 1, 2. The sliding pawls 10, 11 can be released from engagement with the ratchet wheels 9 by manually pulling the pawls 10, 11 back against the action of not shown springs.

A first and simple embodiment of the invention is shown in FIGS. 1-9.

The new feature of the strapping device according to the invention is the special design of the spindle 3. The spindle 3 is adapted as a two-part member comprising a base member 12 and a smaller pivotable member 13. In the closed position, the members 12 and 13 form a slot 14 therebetween for receiving a not shown strap, see FIGS. 4 and 5. The sectional view indicated by V-V on FIG. 3 also defines a plane by which the angular position of the small pivotable member 13 can be asserted. The pivotable member 13 is provided as a round piece of rod which is bent at one end 16 so as to provide a pivotable suspension of the member 13 when the end 16 is seated in a boring 17 in the base member 12. The pivotable member 13 is thereby able to pivot about an axis 15, see FIG. 4, the axis 15 extending at right angles to the base member 12. A stop in the form of a small projection or stop pin 18 is provided at the end of the base member 12 opposite the end provided with the boring 17. In the open position of the member 13, it forms an angle with the plane mentioned above.

A second and preferred embodiment of the invention is shown in FIGS. 10-16, where features in common with the first embodiment are denoted with the same reference numbers.

In the second embodiment of the strapping device of the invention, the spindle 3 is also composed of two parts, a base member 12a and a slender pivotable member 13a. The main difference as compared with the first embodiment is that magnetic means are provided for keeping the pivotable member 13a in the closed position as described below, thus facilitating the operation. The magnetic means are here provided as a small permanent magnet 20 shaped as a disc which is embedded in a recess in the flat surface of the base member 12a and secured by conventional means, e.g. by glue or press-fit, see FIG. 14. The magnet 20 is disposed close to the stop pin 18a so as to hold the free end of the pivotable member 13a close to or in contact with the stop pin 18a.

Other features of the second embodiment are the securing of the pivotable member 13a, the stop pin 18a and the base member 12a. These are all secured by spring-type tubular pins or cotter pins 21 lodged in bored holes in the base member 12a, see FIGS. 10, 13 and 16.

The pivotable member 13a is provided with a circumferential groove 22 at the part extending into the base member 12a, and a cotter pin 21 indicated on FIG. 10 engages in a not shows way with this groove 22, retaining the member 13a in position while a the same time allowing the member 13a to pivot as described below. See FIG. 15.

The pin 18a is provided with a through-going boring 23 in the part inserted in the base member 12a, see FIG. 13, thereby securing the pin 18a to the base member 12a.

The base member 12a is provided with through-going cotter pins 21 in through-going holes at the ends that protrude laterally of the strapping device, se the detail in FIG. 16.

The strapping device according to the invention operates as follows.

Figure 6:
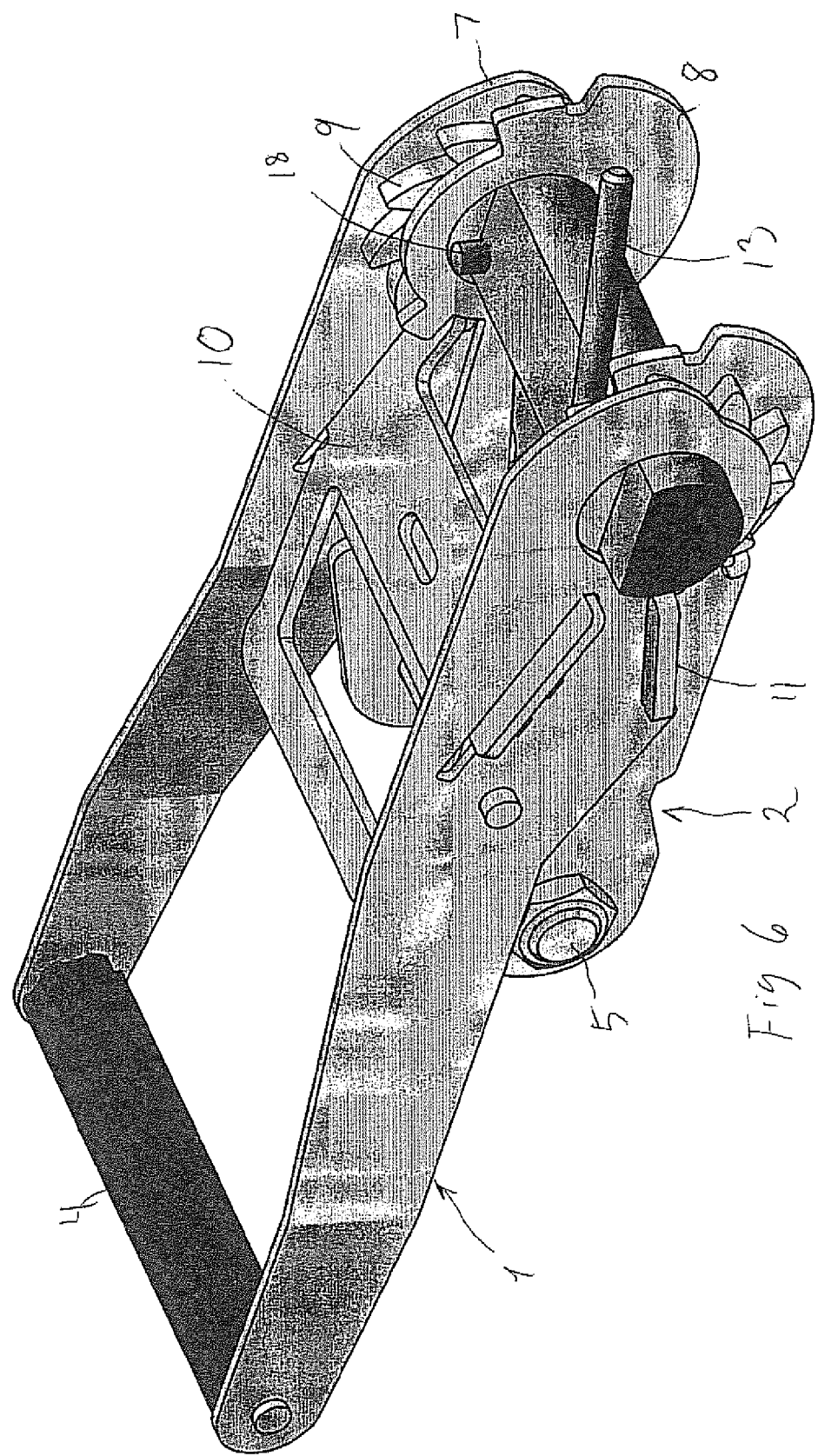
FIG. 6 shows the strapping device of FIG. 1 in perspective view but with the spindle in open position.

At first, the small member 13 of the spindle is pivoted to the open position. FIGS. 6 and 7 shows the member 13 at an angle of about 60° from the closed position, but greater angles more than 90° are possible by the invention. Then the strap or belt, being the same as the one fitted on the bolt 5 or being a separate strap, is laid (not shown) in the free space over the base member 12, 12a. The small member 13, 13a is then pivoted back to closed position shown on FIGS. 1-5 and 10-12, abutting on the stop 18, 18a and receiving the strap in the slot 14. Now the frame part 1 can be pivoted back and forth relative to the second frame part 2, thus providing a rotation in the direction indicated by arrow 19 on FIG. 1; the pivoting action of the member 13a in the second embodiment is not shown but is completely analogous to that of the first embodiment of the strapping device. The stop 18 will now retain the small pivotable member 13, 13a in its closed position when the strap bears on the member 13, 13a due to the rotation of the spindle 3. Eventually, the strap is wound on the spindle 3 in the manner known from the prior art.

When the strap is to be released, the two pawls 10, 11 are pulled back manually so as to make the ratchet wheel 9 and thus the spindle 3 rotate in direction opposite the tightening direction 19. When the last winding is unrolled, the small pivotable member 13, 13a will be carried and drawn by the strap from the closed position to the open position. The strap is thereby released and can be removed without any manipulation of the members 12, 12a; 13, 13a of the spindle 3. The invention thereby provides a more expedient and more time-saving operation than the hitherto known strapping devices.

Other embodiments of the invention are possible with the scope of the claims. The pivotable member of the spindle can have other shapes, e.g. rectangular in cross-section, and be composed of more than one part. The stop for limiting the pivoting of the pivotable member can be provided by other means, e.g. by a special configuration at the seating of the member. The magnetic means may be provided in other ways, e.g. by the stop pin itself being magnetic. Also the base member of the spindle can have other cross-sections than the partially circular shown in the drawings.

The invention claimed is:

1. A load-strapping device including at least two frame parts connected by a pivotable joint, where one frame part is attached to a strap, where the joint between the frame parts is provided with a spindle extending between parallel flanges of the frame parts, the pivotable joint between the frame parts provided at opposite ends of the spindle with a pawl-and-ratchet mechanism which provides one-way rotation of the spindle when the frame parts are pivoted repeatedly in opposing directions, the spindle itself being a two-part design, where a first part of the spindle can be moved relatively to a second part of the spindle in order to engage and/or release a strap between the parts of the spindle, characterised in that the first part of the spindle is suspended pivotably about a pivot axis extending through one end of the spindle and substantially at a right angle to the spindle so that the first part can be pivoted between a closed position defined as substantially in parallel with the second part of the spindle and so that a plane containing the pivot axis extends longitudinally through the first and second parts of the spindle, and an open position defined as the first part being pivoted so as to form an angle with the plane.

2. Load-strapping device according to claim 1, wherein in the closed position, the first part of the spindle abuts with its distal end on a stop provided in the device.

3. Load-strapping device according to claim 2, wherein the distal end of the first part of the spindle is biased towards its closed position by magnetic means.

4. Load-strapping device according to claim 2, wherein the first part of the spindle is made of a round rod with an angular bend at one end which extends into and is seated in the second part of the spindle.

5. Load-strapping device according to claim 2, wherein the stop is a cylindric pin seated in and extending above a surface of the second part of the spindle, and wherein the cylindric pin is secured by a spring-type pin or cotter pin provided in a boring in the second part of the spindle.

6. Load-strapping device according to claim 4, wherein the first part of the spindle is secured by a spring-type pin or cotter pin provided in a boring in the second part of the spindle and engaging a groove in the end of the first part of the spindle seated in the second part of the spindle.

7. Load-strapping device according to claim 3, wherein the magnetic means for biasing the end of the spindle towards its closed position comprises a permanent magnet embedded in a surface of the second part of the spindle.

8. Load-strapping device according to claim 1 wherein the largest angle formed by first part of the spindle in the open position is at least 60°.

9. Load-strapping device according to claim 1 wherein the shape of the second part of the spindle is partially circular.

* * * * *